United States Patent

[11] 3,554,536

| [72] | Inventor | Roy E. Richter<br>9835 Wiley Burke Ave., Downey, Calif. 90240 |
|---|---|---|
| [21] | Appl. No. | 769,591 |
| [22] | Filed | Oct. 22, 1968 |
| [45] | Patented | Jan. 12, 1971 |

[54] MOTOR VEHICLE WHEEL AND COVER ASSEMBLY
4 Claims, 3 Drawing Figs.

| [52] | U.S. Cl. | 301/108 |
|---|---|---|
| [51] | Int. Cl. | B60b 7/06 |
| [50] | Field of Search | 301/108 (S), 37(S), 108, 37 |

[56] References Cited
UNITED STATES PATENTS

| 1,532,965 | 4/1925 | Vallot | 301/108(S) |
|---|---|---|---|
| 1,861,432 | 6/1932 | Barber | 301/37(S) |
| 2,016,395 | 10/1935 | Sinclair | 301/37(S) |

Primary Examiner—Richard J. Johnson
Attorney—Jessup & Beecher

ABSTRACT: An improved wheel assembly for a motor vehicle is provided whereby a hub cap and wheel are supported on the hub of the vehicle by lug bolts which extend through the wheel and through the hub cap, and which includes resilient insert means between the hub cap and the wheel to assure that the assembly will be properly mounted on the hub despite manufacturing tolerances.

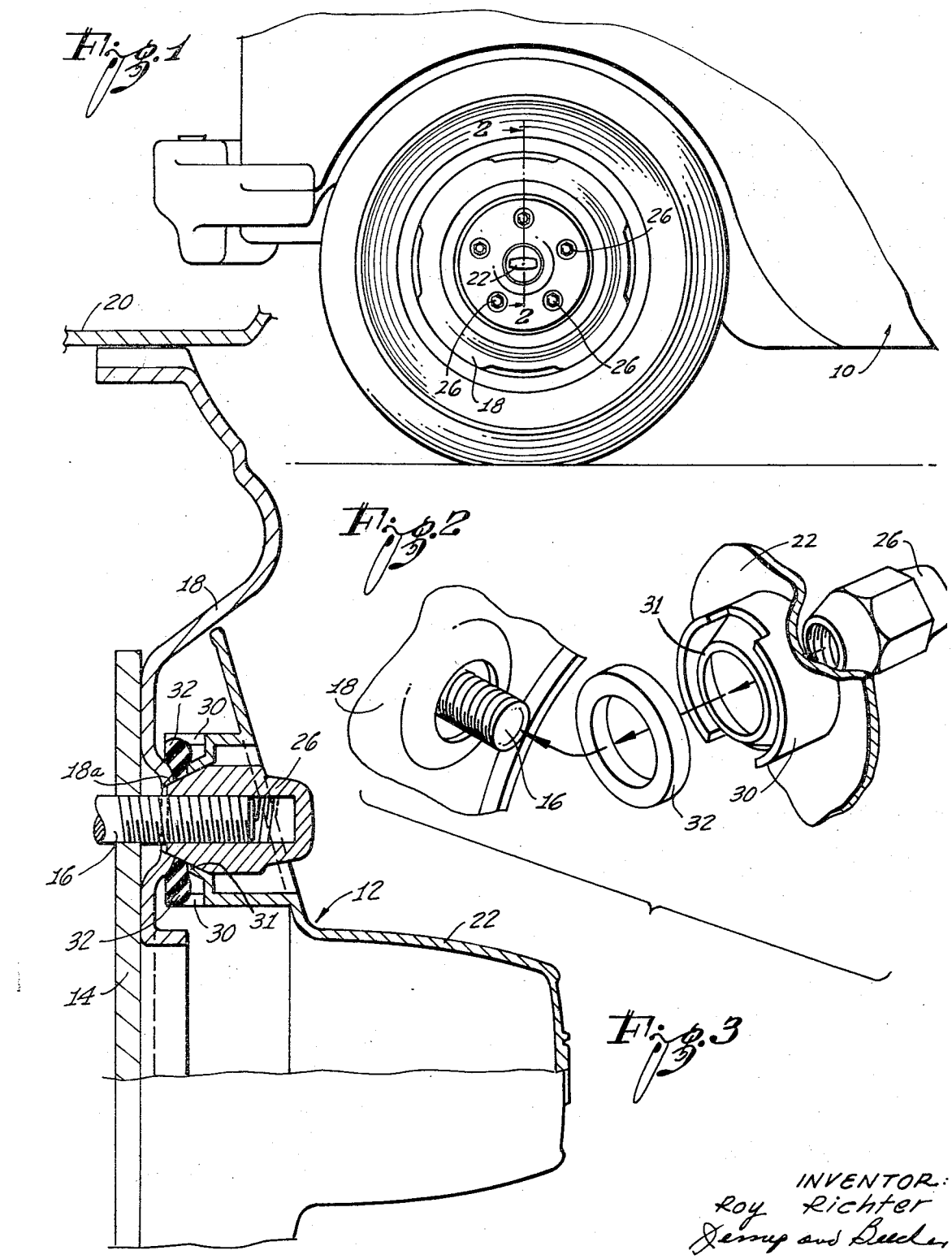

ically shows# 3,554,536

MOTOR VEHICLE WHEEL AND COVER ASSEMBLY

BACKGROUND OF THE INVENTION

A large market has been developing in recent years among automobile owners for chromed steel wheels for passenger motor vehicles. The most economical wheel assembly of the chromed steel type is one in which the wheel spider and rim are polished, finish chrome plated and assembled into a unitary structure. After assembly the two parts are either welded or riveted together, preferably the former. However, the shape of the central portion of the wheel spider around the lug bolts is such that it is virtually impossible to do a good job of chrome plating, and extensive hand polishing is required which is prohibitively expensive.

One popular solution to the problem outlined in the preceding paragraph is to provide a snap-on dome-shaped chrome plated hub cap over the central area of the wheel spider, and which covers the ends of the lug bolts and the lug nuts. Such an expedient has been successfully used for many years. However, it is now considered most desirable, especially among custom car enthusiasts, for the lug nuts themselves to be exposed and to be chrome plated. This means that the old expedient of the dome-shaped snap-on hub cap is not appropriate. However, the unsightly central area of the wheel spider may be covered by a hub cap and the lug nuts may still be exposed, by permitting the lug bolts to extend through apertures in the hub cap and threading the lug nuts over the protruding portions of the lug bolts. With such an assembly, the lug nuts serve not only to mount the wheel on the hub of the vehicle, but they also serve to mount the hub cap on the wheel spider of the motor vehicle.

However, the latter assembly poses problems of its own. For example, when the lug nuts are tightened to fasten the wheel spider onto the drive hub of the vehicle, each lug nut has a tapered end which normally has a definite relationship with a corresponding tapered seat in the corresponding aperture in the wheel spider. However, when the tapered ends of the nuts are additionally used to hold the hub cap on the wheel, manufacturing tolerances in the production of wheels does not assure that the hub caps will be supported on the wheel firmly without rattling, without gaps, and without damages to the hub or spider when the assembly is tightened.

The construction of the present invention provides channels around the apertures in the hub cap so that resilient insert members may be interposed between the hub cap and the wheel spider to build up resiliency between the hub cap and the wheel spider so as to take up tolerance discrepancies. The function of the resilient inserts in the assembly of the invention allows each lug nut to be tightened against the corresponding tapered seat in the corresponding aperture in the wheel spider, so that the wheel is firmly held on the drive hub. The resilient inserts also exert an outward pressure against the hub cap, holding it firmly against the intermediate tapered portions of the individual lug nuts. In this manner, the hub cap is firmly held in place by the lug nuts in a position displaced slightly out from the surface of the wheel spider itself, thereby allowing clearance room for any tolerance discrepancies in the shape of the wheel spider.

BRIEF DESCRIPTION OF THE DRAWING

FIG. 1 is a fragmentary view of a motor vehicle, and showing a wheel assembly which may incorporate the concepts of the present invention;

FIG. 2 is a sectional view of the assembly of FIG. 1, taken substantially along the line 2—2; and FIG. 3 is a perspective exploded representation of certain components of the assembly of FIG. 2.

DETAILED DESCRIPTION OF THE ILLUSTRATED EMBODIMENT

As mentioned above, FIG. 1 represents a portion of a motor vehicle 10, including a wheel assembly 12 which constitutes, for example, the front left wheel of the vehicle. The other wheels of the vehicle may, of course, be similarly constructed. As best shown in FIG. 2, for example, the drive hub 14 of the vehicle includes a plurality of lug bolts such as the bolt 16, and which extend out from the plane of the hub. The wheel assembly 12 includes a chrome-plated wheel spider 18 which is welded, or otherwise attached, to a rim 20.

As mentioned above, the unsightly central portion of the wheel spider 18 is covered by a hub cap 22, the hub cap having apertures therein through which the lug bolts 16 extend. The hub cap and the wheel of the assembly are held on the hub 14 by lug nuts 26, the lug nuts being threaded onto corresponding ones of the lug bolts 16. The lug nuts themselves, as well as the hub cap 22 are usually chrome plated to enhance the appearance of the assembly.

As best shown in FIGS. 2 and 3, for example, the wheel spider 18 has a tapered seat 18a around the rim of each of the apertures which receive the lug bolts 16, and the lug nuts 26 have a tapered end which extends into the corresponding aperture and bears against its tapered seat 18a as shown in FIG. 2. The tapered end of each of the lug nuts 26 also serves to hold the hub cap 22 in place in the assembly.

Tolerance problems now arise. For example, the peripheral edge of the hub cap 22 should engage the spider surface without an unsightly gap in one extreme and without bending the hub cap in the other extreme. Also, if the tapers on the nuts and hub cap don't match, the hub cap will either be loosely supported and rattle, or else it will be bent and damaged when the nuts are tightened.

In the construction of the present invention, an annular channel is provided on the inner face of the hub cap 22 around each of the tapered apertures in the hub cap by means of an annular wall 30, as shown tapers in FIG. 3. Within each wall 30 is an annular shoulder 31. A resilient annular insert 32 is fitted into the annular channel, and bears against the shoulder 31, as shown in FIG. 3. The insert extends axially out from the channel against the edge of the corresponding aperture in the spider 18. Then, as the lug nuts 26 are tightened, the resilient inserts 32 serve to displace the hub cap 22 out from the wheel spider 18, and builds up a resilient area between the hub cap and the wheel spider to take up the tolerance discrepancies in the construction of the wheel spiders.

The aforesaid resiliency permits each nut 26 to be tightened down against its corresponding tapered seat 18a to hold the wheel firmly against the hub of the vehicle, so that a positive mounting is achieved for each of the lug nuts despite tolerance discrepancies. At the same time the hub cap 22a is held firmly out from the wheel spider with sufficient clearance being provided to allow clearance for discrepancies in the shape of the spider. Also, the nuts can be tightened to bring the peripheral edge of the hub cap to within a desired clearance with the surface of the spider.

The concept and assembly of the present invention provides a simple solution for a problem that has long been troublesome in the motor vehicle art. The assembly represents a simple and straightforward means for achieving the desired result with a minimum of extraneous components and parts.

While a particular embodiment has been shown and described, modifications may be made. It is intended in the claims to cover the modifications which come within the scope of the invention.

I claim:

1. A wheel assembly to be mounted on the lug bolts of the hub of a motor vehicle, said assembly including:
    a wheel spider having a central portion with apertures therein for receiving said lug bolts;
    a hub cap fitted over said central portion of said wheel spider and also having apertures therein for receiving said lug bolts;
    annular resilient inserts interposed between said hub cap and said wheel spider and respectively surrounding the apertures in said wheel spider and said hub cap, said hub cap having an annular wall of on the inner face thereof around each of said apertures, for receiving and retaining therewithin said inserts in position around respective ones of said apertures; and lug nuts threaded onto the ends of said lug bolts protruding through the apertures in said wheel spider and hub cap to hold said wheel spider and hub cap on said hub, with said resilient inserts holding said hub cap spaced out from the surface of said wheel spider.

2. The assembly defined in claim 1, in which said lug nuts each has a tapered end, and said wheel spider has a tapered seat surrounding each of the apertures therein which receives the tapered end of the corresponding lug nut.

3. The assembly defined in claim 1, including annular shoulders within respective said annular walls against which said inserts bear.

4. A wheel assembly to be mounted on the lug bolts of the hub of a motor vehicle, said assembly including:
a first member in the form of a wheel spider having a central portion with apertures therein for receiving said lug bolts;
a second member in the form of a hub cap fitted over said central portion of said wheel spider and also having apertures therein for receiving said lug bolts;
annular resilient inserts interposed between said hub cap and said wheel spider and respectively surrounding the apertures in said wheel spider and said hub cap;
one of said members having an annular wall on the face thereof which faces the other member, and around at least certain of said apertures, for receiving and retaining therewithin said inserts in position around respective ones of said apertures; and
lug nuts threaded onto the ends of said lug bolts protruding through the apertures in said wheel spider and hub cap to hold said wheel spider and hub cap on said hub, with said resilient inserts holding said hub cap spaced out from the surface of said wheel spider.